United States Patent
Czaplewski et al.

(10) Patent No.: US 10,613,254 B2
(45) Date of Patent: Apr. 7, 2020

(54) ULTRATHIN, POLARIZATION-INDEPENDENT, ACHROMATIC METALENS FOR FOCUSING VISIBLE LIGHT

(71) Applicant: UCHICAGO ARGONNE, LLC, Chicago, IL (US)

(72) Inventors: David A. Czaplewski, Naperville, IL (US); Haogang Cai, Naperville, IL (US); Daniel Lopez, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/140,258

(22) Filed: Sep. 24, 2018

(65) Prior Publication Data
US 2019/0025464 A1   Jan. 24, 2019

Related U.S. Application Data

(63) Continuation-in-part of application No. 15/604,490, filed on May 24, 2017, now Pat. No. 10,324,314.

(51) Int. Cl.
*G02B 1/00* (2006.01)
*G02B 3/02* (2006.01)
(Continued)

(52) U.S. Cl.
CPC .............. *G02B 1/002* (2013.01); *G02B 3/02* (2013.01); *G02B 3/08* (2013.01); *G02B 5/1876* (2013.01); *B82Y 20/00* (2013.01); *G02B 5/1809* (2013.01)

(58) Field of Classification Search
CPC ...... G02B 6/1225; G02B 1/002; G02B 1/005; G02B 26/02; G02B 27/0093;
(Continued)

(56) References Cited

U.S. PATENT DOCUMENTS 3,348,093 A   10/1967   Holly
4,028,652 A   6/1977    Wakino et al.
(Continued)

OTHER PUBLICATIONS

Arabi, et al., "Proteomic screen reveals Fbw7 as a modulator of the NF-?B pathway," Nature Communications 3, 976, 11 pages (2012).
(Continued)

*Primary Examiner* — Collin X Beatty
*Assistant Examiner* — Grant A Gagnon
(74) *Attorney, Agent, or Firm* — Foley & Lardner LLP

(57) ABSTRACT

An optical device includes a titanium dioxide substrate layer on a quartz base of a substrate. The substrate is configured to focus light in visible wavelength spectrum of 400 nm to 700 nm. The substrate comprises a first zone and a second zone. In some embodiments, the first zone and the second zone are concentric circles. A plurality of resonators are disposed on the substrate, the plurality of resonators comprising a first plurality corresponding to the first zone and a second plurality corresponding to the second zone. Each resonator is comprised of a dielectric material with a defined thickness "t" in the range of 30 nm to 300 nm. Each resonator has a radius "r" in the range of 30 nm to 300 nm and a gap "g" between adjacent resonators in the range of 5 nm to 200 nm. The first plurality of resonators in the first zone have a first radius within a first radius range that is different from a second radius range of the second plurality of resonators in the second zone. The plurality of resonators form a metasurface that defines at least in part an ultra-thin achromatic lens of the optical device.

19 Claims, 9 Drawing Sheets

(51) Int. Cl.
G02B 3/08 (2006.01)
G02B 5/18 (2006.01)
B82Y 20/00 (2011.01)

(58) Field of Classification Search
CPC .... G02B 27/017; G02B 27/283; G02B 27/48;
G02B 3/14; G02B 5/32; G02B 6/0038;
G02B 6/0056; G02B 6/1226; G02B
6/29302; G02B 1/007; G02B 2006/12119;
G02B 2006/12123; G02B 2006/12142;
G02B 2006/12145; G02B 2027/0112;
G02B 2027/014; G02B 2027/0178; G02B
2027/0187; G02B 23/14; G02B 26/00;
G02B 26/001; G02B 26/004; G02B
26/06; G02B 26/0816; G02B 26/0833;
G02B 27/0101; G02B 27/0172; G02B
27/1073; G02B 27/1086; G02B 27/16;
G02B 27/2214; G02B 27/2228; G02B
3/0006; G02B 5/00; G02B 5/008; G02B
5/02; G02B 5/0231; G02B 5/0252; G02B
5/0257; G02B 5/0289; G02B 5/0294;
G02B 5/08; G02B 5/12; G02B 5/122;
G02B 5/126; G02B 5/1876; G02B
5/1885; G02B 5/23; G02B 5/284; G02B
5/285; G02B 5/3008; G02B 5/3066;
G02B 5/3083; G02B 6/002; G02B
6/0026; G02B 6/0028; G02B 6/0035;
G02B 6/0036; G02B 6/0043; G02B
6/0046; G02B 6/005; G02B 6/0061;
G02B 6/0063; G02B 6/0076; G02B
6/12004; G02B 6/12007; G02B 6/2713;
G02B 6/272; G02B 6/2746; G02B
6/2773; G02B 6/29353; G02B 6/29355;
G02B 6/29358; G02B 6/29386; G02B
6/29395
USPC ........................................................ 359/240
See application file for complete search history.

(56) References Cited

U.S. PATENT DOCUMENTS

| | | | |
|---|---|---|---|
| 4,459,570 | A | 7/1984 | Delaballe et al. |
| 4,506,241 | A | 3/1985 | Makimoto et al. |
| 4,862,122 | A | 8/1989 | Blair et al. |
| 5,436,754 | A | 7/1995 | Ishihara et al. |
| 6,104,261 | A | 8/2000 | Sonoda et al. |
| 6,882,739 | B2 | 4/2005 | Kurtz et al. |
| 9,374,887 | B1 | 6/2016 | Warne et al. |
| 9,507,064 | B2 | 11/2016 | Brongersma et al. |
| 9,577,477 | B2 | 2/2017 | Fujiyama et al. |
| 9,685,765 | B2 | 6/2017 | Sinclair et al. |
| 9,739,918 | B2 | 8/2017 | Arbabi et al. |
| 9,911,902 | B2 | 3/2018 | Sawamura et al. |
| 9,939,129 | B2 | 4/2018 | Byrnes et al. |
| 10,054,839 | B1 | 8/2018 | Brener et al. |
| 10,128,387 | B1 | 11/2018 | Liu et al. |
| 2016/0025914 | A1 | 1/2016 | Brongersma et al. |
| 2016/0077261 | A1 | 3/2016 | Arbabi et al. |
| 2016/0156090 | A1 | 6/2016 | Campione et al. |
| 2017/0212285 | A1 | 7/2017 | Arbabi et al. |
| 2018/0341090 | A1 | 11/2018 | Devlin et al. |

OTHER PUBLICATIONS

Arbabi, et al., "Multiwavelength metasurfaces through spatial multiplexing," Scientific Reports 6, 32803, 8 pages (2016).
Avayu, et al., "Composite functional metasurfaces for multispectral achromatic optics," Nature Communications 8, 14992, 7 pages (2017).
Chen & Craighead, "Diffractive lens fabricated with mostly zeroth-order gratings," Optics Letters 21(3), pp. 177-179 (1996).
Chen & Craighead, "Diffractive phase elements based on two-dimensional artificial dielectrics," Optics Letters 20(2), pp. 121-123 (1995).
Chen, et al., "A broadband achromatic metalens for focusing and imaging in the visible," Nature Nanotechnology 13, pp. 220-226 (2018).
Decker & Staude, et al., "Resonant dielectric nanostructures: a low-loss platform for functional nanophotonics," Journal of Optics 18(10) (2016).
Decker, et al., "High-Efficiency Dielectric Huygens' Surfaces," Advanced Optical Materials 3(6), pp. 813-820 (2015).
Devlin, et al., "Broadband high-efficiency dielectric metasurfaces for the visible spectrum," Proceedings of the National Academy of Sciences USA, 201611740, 6 pages (2016).
Estakhri & Alu, "Recent progress in gradient metasurfaces," Journal of the Optical Society of America B 33(2), pp. A21-A30 (2016).
Evlyukhin, et al., "Optical response features of Si-nanoparticle arrays," Physical Review B 82, 045404, 12 pages (2010).
Faklis & Morris, et al., "Spectral properties of multiorder diffractive lenses," Applied Optics 34(14), pp. 2462-2468 (1995).
Fu, et al., "Directional visible light scattering by silicon nanoparticles," Nature Communications 4, 1527, 6 pages (2013).
Genevet, et al., "Recent advances in planar optics: from plasmonic to dielectric metasurfaces," Optica 4(1), pp. 139-152 (2017).
Hu, et al., "Plasmonic Lattice Lenses for Multiwavelength Achromatic Focusing," ACS Nano 10(11), pp. 10275-10282 (2016).
Jahani & Jacob, "All-dielectric metamaterials," Nature Nanotechnology 11, pp. 23-36 (2016).
Khorasaninejad & Capasso, "Metalenses: Versatile multifunctional photonic components," Science 358(6367), 1146, 8 pages (2017).
Khorasaninejad, et al., "Achromatic Metalens over 60 nm Bandwidth in the Visible and Metalens with Reverse Chromatic Dispersion," Nano Letters 17(3), pp. 1819-1824 (2017).
Khorasaninejad, et al., "Metalenses at visible wavelengths: Diffraction-limited focusing and subwavelength resolution imaging," Science 352(6290), pp. 1190-1194 (2016).
Khorasaninejad, et al., "Polarization-Insensitive Metalenses at Visible Wavelengths," Nano Letters 16(11), pp. 7229-7234 (2016).
Kuznetsov, et al., "Optically resonant dielectric nanostructures," Science 354(6314), aag2472, 10 pages (2016).
Lalanne & Chavel, "Metalenses at visible wavelengths: past, present, perspectives," Laser & Photonics Reviews 11(3), 1600295 (2017).
Li, et al., "Achromatic flat optical components via compensation between structure and material dispersions," Scientific Reports 6, 19885, 7 pages (2016).
Liddle & Gallatin, "Nanomanufacturing: A Perspective," ACS Nano 10(3), pp. 2995-3014 (2016).
Moreno, et al., "High efficiency diffractive lenses: Deduction of kinoform profile" American Journal of Physics 65, pp. 556-562 (1997).
Nagar, et al., "Apochromatic singlets enabled by metasurface-augmented GRIN lenses," Optica 5(2), pp. 99-102 (2018).
Piyawattanametha, et al., "In vivo near-infrared dual-axis confocal microendoscopy in the human lower gastrointestinal tract," Journal of Biomedical Optics 17(2), 021102, 5 pages (2012).
Roy, et al., "Dynamic metasurface lens based on MEMS technology," APL Photonics 3, 021302, 8 pages (2018).
Shi, et al., "Single-Layer Metasurface with Controllable Multiwavelength Functions," Nano Letters 18(4), pp. 2420-2427 (2018).
Staude & Schilling, "Metamaterial-inspired silicon nanophotonics," Nature Photonics 11, pp. 274-284 (2017).
Staude, et al., "Tailoring Directional Scattering through Magnetic and Electric Resonances in Subwavelength Silicon Nanodisks," ACS Nano 7(9), pp. 7824-7832 (2013).
Taghizadeh, et al., "Design and fabrication of diffractive elements for laser material processing applications," Optics and Lasers in Engineering 34(4-6), pp. 289-307 (2000).
U.S. Office Action on U.S. Appl. No. 15/604,490 dated May 25, 2018.

(56) References Cited

OTHER PUBLICATIONS

Van De Groep & Polman, "Designing dielectric resonators on substrates: Combining magnetic and electric resonances," Optics Express 21(22), pp. 26285-26302 (2013).
Wang, et al., "A broadband achromatic metalens in the visible," Nature Nanotechnology 13, pp. 227-232 (2018).
Wang, et al., "Achromatic Fresnel optics for wideband extreme-ultraviolet and X-ray imaging," Nature 424, pp. 50-53 (2003).
Wang, et al., "Broadband achromatic optical metasurface devices," Nature Communications 8, 187, 9 pages (2017).
Yi, et al., "Strong visible magnetic resonance of size-controlled silicon-nanoblock metasurfaces," Applied Physics Express 9(4), (2016).
Yu & Capasso, "Flat optics with designer metasurfaces," Nature Materials 13, pp. 139-150 (2014).

ULTRATHIN, POLARIZATION-INDEPENDENT, ACHROMATIC METALENS FOR FOCUSING VISIBLE LIGHT

PRIORITY CLAIM

The present application is a continuation-in-part of U.S. application Ser. No. 15/604,490, entitled ULTRA-FLAT OPTICAL DEVICE WITH HIGH TRANSMISSION EFFICIENCY, filed on May 24, 2017, which is herein incorporated by reference in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates generally to the field of optical devices. In particular, the present invention relates to an ultrathin, polarization-independent metalens to manipulate multiple wavelengths of visible light.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Lenses, and increasingly metalenses (lenses used in metasurface-based flat optics), are an integral part of a large number of optical systems, including microscopes, cameras, telescopes, spectrometers, and so on. In metasurface-based flat optics, metasurfaces are thin films with sub-wavelength (less than the wavelength of the light employed) thickness containing sub-wavelength in-plane features (meta-atoms) that are used to realize a desirable functionality by local modification of the interaction between the thin film and the incident electromagnetic fields. In recent years, such structures have attracted significant attention due to their potential to provide excellent control of properties of transmitted or reflected fields, such as directivity, polarization and orbital angular momentum, with low-profile conformal devices.

Light is electromagnetic radiation within a certain portion of the electromagnetic spectrum. The wavelength of visible light ranges from roughly 400 nm to roughly 700 nm. Monochromatic light consists of a single wavelength, and monochromatic lenses work for the light with the desired single wavelength. Problematically, metasurfaces using conventional phase-shifter elements for monochromatic lenses require high-aspect-ratio fabrication techniques not always compatible with standard semiconductor fabrication processes. Achromatic light consists of multiple wavelengths, and achromatic lenses can transmit multiple colors. Problematically, chromatic aberrations are a significant technical barrier that precludes the use of metasurface-based flat optics in the most demanding optical systems. Correction of chromatic aberrations has been addressed by various approaches, such as spatial multiplexing, multi-layer stacking, hybrid integration, multi-material dispersion compensation, and independent control of phase and group delay. Most of these approaches have achieved achromatic focusing. However, this conventionally comes at a cost of fabrication complexity, performance decline or limitations, such as limited lens size and numerical aperture, and polarization dependence.

SUMMARY

An example embodiment relates to an optical device.

In some embodiments, the optical device includes a substrate configured to focus light in visible wavelength spectrum of 400 nm to 700 nm. In some embodiments, the optical device includes at least one layer comprising a plurality of resonators on the substrate.

In some embodiments, the substrate comprises a first zone and a second zone. The plurality of resonators comprise a first plurality corresponding to the first zone and a second plurality corresponding to the second zone, each of the plurality of resonators having a gap "g" in the range of 5 nm to 200 nm between adjacent resonators of the plurality of the resonators. Each resonator is comprised of a dielectric material with a defined thickness "t" in the range of 30 nm to 300 nm. Each resonator has a radius "r" in the range of 30 nm to 300 nm. The plurality of resonators form a metasurface. In some embodiments, the first plurality of resonators in the first zone have a first radius within a first radius range that is different from a second radius range of the second plurality of resonators in the second zone. In some embodiments, the first plurality of resonators in the first zone have a first gap within a first gap range that is different from a gap radius range of the second plurality of resonators in the second zone.

In some embodiments, each of the first zone and the second zone are adjacent concentric circles progressively increasing in radii. In some embodiments, each of the first zone and the second zone is defined by $$r_n = \sqrt{n\lambda\left(f + \frac{n\lambda}{4}\right)},$$

wherein $r_n$ denotes nth zone radius, $\lambda$ denotes wavelength, and f denotes focal distance.

In some embodiments, the metasurface comprises a modified Fresnel zone plate. The modified Fresnel zone plate comprises the first zone configured to transmit black, the first zone comprising the first plurality of resonators, each having a first radius within a range of 30 nm to 300 nm, and a first gap between resonators within a range of 5 nm to 200 nm, and the second zone configured to transmit white, the second zone comprising the second plurality of resonators. In some embodiments, each of the second plurality of resonators has a second radius of 100 nm and a second gap between resonators of 86 nm. In some embodiments, the modified Fresnel zone plate comprises at least one of: the first zone comprising the first plurality of resonators, each having a first radius and a first gap, wherein the first zone is configured to transmit black by pre-setting the first radius and the first gap; the second zone comprising the second plurality of resonators, each having a second radius and a second gap, wherein the second zone is configured to transmit white by pre-setting the second radius and the second gap; a third zone comprising a third plurality of resonators, each having a third radius and a third gap, wherein the third zone is configured to transmit red by pre-setting the third radius and the third gap; a fourth zone comprising a fourth plurality of resonators, each having a fourth radius and a fourth gap, wherein the fourth zone is configured to transmit green by pre-setting the fourth radius and the fourth gap; a fifth zone comprising a fifth plurality of resonators, each having a fifth radius and a fifth gap, wherein the fifth zone is configured to transmit yellow by pre-setting the fifth radius and the fifth gap; a sixth zone comprising a sixth plurality of resonators, each having a sixth radius and a sixth gap, wherein the sixth zone is configured to transmit blue by pre-setting the sixth radius and the sixth gap; a seventh zone comprising a seventh plurality of resonators, each having a seventh radius and a seventh gap, wherein the seventh zone is configured to transmit magenta by pre-setting the seventh radius and the seventh gap; and an eighth zone comprising an eighth plurality of resonators, each having an eighth radius and an eighth gap, wherein the eighth zone is configured to transmit cyan by pre-setting the eights radius and the eighth gap. In some embodiments, the first radius is 240 nm and the first gap between resonators is 162 nm, the second radius is 100 nm and the second gap between resonators is 86 nm, the third radius is 114 nm and the third gap between resonators is 154 nm, the fourth radius is 158 nm and the fourth gap between resonators is 152 nm, the fifth radius is 108 nm and the fifth gap between resonators is 112 nm, the sixth radius is 136 nm and the sixth gap between resonators is 176 nm, the seventh radius is 130 nm and the seventh gap between resonators is 104 nm, and the eighth radius is 162 nm and the first gap between resonators is 106 nm.

In some embodiments, each of the plurality of resonators is substantially a right circular cylinder or substantially a right elliptical cylinder, and at least some of the plurality of the resonators have a constant radius and a constant gap.

In some embodiments, the metasurface is configured to modulate amplitude of multiple different wavelengths of a visible light spectrum by setting the gap "g" between at least some of the plurality of resonators to a predetermined value and by setting the radius "r" of at least some of the plurality of resonators to a predetermined value. In some embodiments, the metasurface is configured to support more than two transmission states. In some embodiments, the metasurface is configured to support at least $2^n$ transmission states, wherein n is a number of multiple wavelengths. In some embodiments, the different wavelengths are red, green, and blue. In some embodiments, at least some of the different wavelengths are blocked such at least one of cyan, magenta and yellow color streams is transmitted.

In some embodiments, each of the plurality of the resonators comprises titanium dioxide. In some embodiments, each of the plurality of the resonators comprises gallium phosphide.

In some embodiments, the metasurface has an aspect ratio of smaller than 1:1.

In some embodiments, the metasurface comprises a plurality of zones or layers. In some embodiments, each layer has a unique focal point. In some embodiments, each zone or layer has a unique beam shaping function.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which:

FIGS. 1A and 1B show embodiments that expand optics functions from single-wavelength to multi-wavelength, wherein FIG. 1A shows conventional techniques and FIG. 1B shows an embodiment using a metasurface based on thin resonators;

FIG. 3A shows aspects of a metalens for achromatic transmission. FIG. 3B shows aspects of a metalens for achromatic transmission using a digital transmission modulation scheme. FIG. 3C shows supporting data for various parameters of the embodiment of FIG. 3B;

DETAILED DESCRIPTION

Figure 1A:
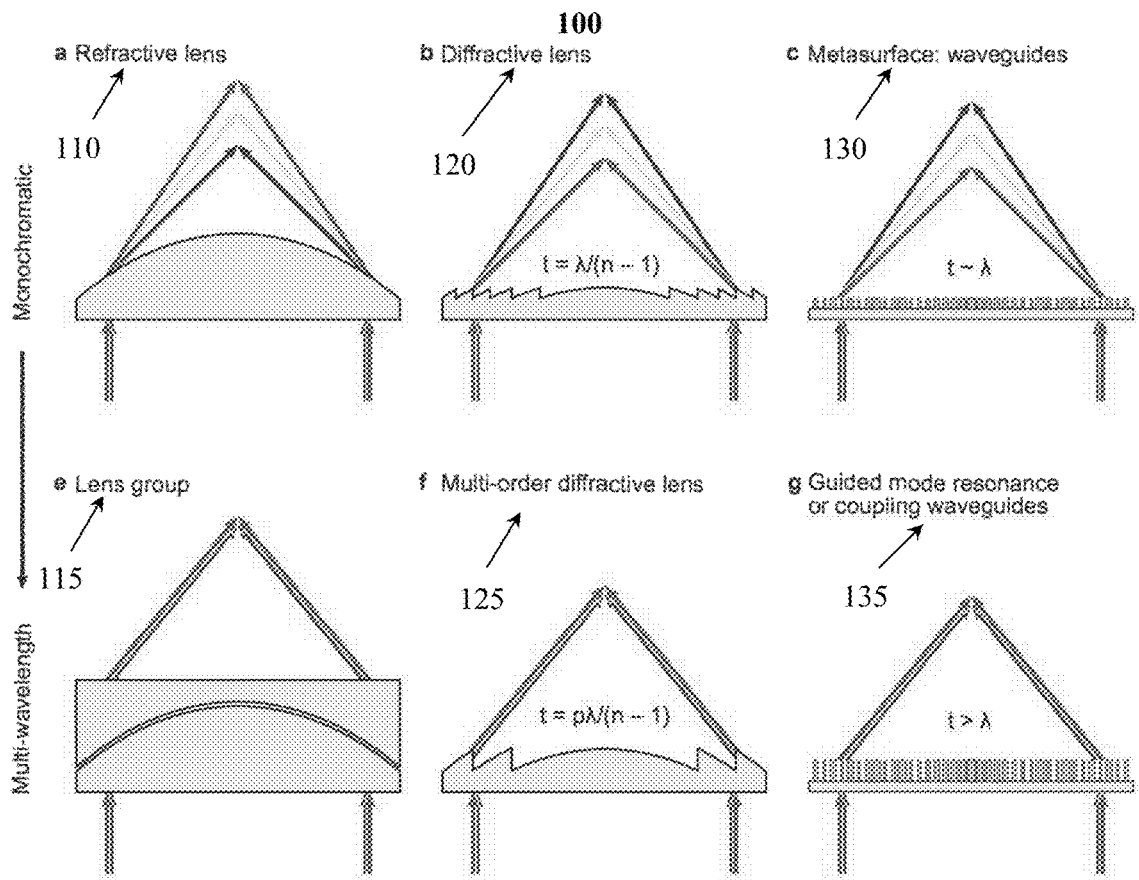

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting. The present disclosure relates to an ultrathin, polarization-independent metalens for manipulating multiple wavelengths of visible light.

The device of the present disclosure comprises ultrathin and polarization insensitive achromatic metalenses capable of bringing three visible wavelengths into focus on the same point. An ultrathin and polarization insensitive achromatic metalens capable of bringing three visible wavelengths into focus on the same point enables smaller, more compact optical designs in key markets such as cell phone cameras and endoscopes. The low aspect ratio of the metasurfaces provides better compatibility with complementary metal-oxide-semiconductor (CMOS) fabrication and better scalability with high throughput techniques. The device of the present disclosure is designed to operate across the blue (wavelength 380-495 nm; frequency 606-789 THz; photon energy 2.5-3.26 eV), green (wavelength 495-590 nm; frequency 508-606 THz; photon energy 2.1-2.5 eV) and red (wavelength 590-700 nm; frequency 428-508 THz; photon energy 1.77-2.1 eV) spectrum. These spectra may intersect.

The multi-wavelength digital transmission modulation approach described herein enables opportunities to design optical elements beyond conventional binary diffractive optics. Multi-wavelength digital transmission modulation can be used to manipulate a large number of discrete wavelengths with distinct functionalities. In an example embodiment, in order to control n different wavelengths, $2^n$ transmission states (n-bits) need to be manipulated. According to various embodiments, n is whole a number such as 2, 3, or greater. Mie resonances can be engineered to manipulate the transmission states of arbitrary bands of visible light. By designing the geometrical parameters (e.g., gap, radius, etc.) of the ultrathin dielectric nanoresonators disposed on a substrate, a variety of resonances can be induced, enabling precise tailoring of the multiple transmission patterns required for n wavelengths. Thus, by spatially modulating the amplitude of the transmitted light, from zero transmission up to full transmission (FIG. 3A, 3B), instead of engineering the phase profile, inventors significantly simplify the lens design and the geometry of the constitutive elements to enable the fabrication of polarization-independent achromatic optics in a single layer with a single-step lithography. In some embodiments, multiple layers are contemplated. Additionally, the low aspect ratio of the metasurfaces (ratio of the thickness of the metasurface (approximately 100 nm thick) to the diameter of the nanodiscs (the diameter ranging from 200 to 480 nm)) provides better compatibility with CMOS fabrication, and better scalability with high throughput techniques.

Figure 1B:
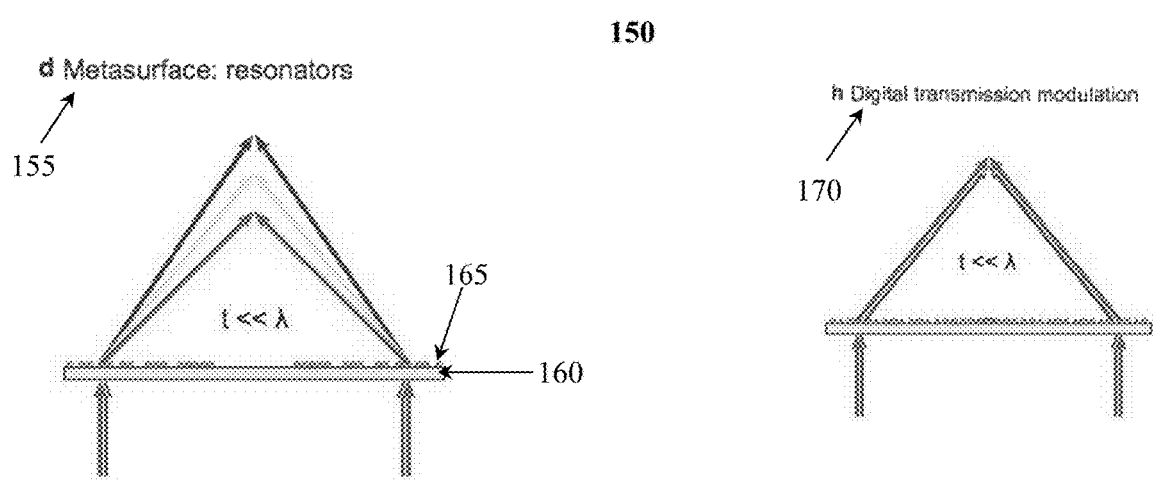

FIGS. 1A and 1B show embodiments that expand optics functions from single-wavelength to multi-wavelength, wherein FIG. 1A shows conventional techniques and FIG. 1B shows an embodiment using a metasurface based on thin resonators.

Referring now to FIG. 1A, conventional design strategies to expand optics functions from single-wavelength to multi-wavelength are shown. Generally, bulk refractive optics manipulate light propagation by introducing spatial phase delays given by the macroscopic shape of the particular optical elements. Driven by the prospect of integrating optical components with electronics and micromechanical devices, to foster a new generation of compact and agile optical systems, the development of metasurface-based flat optics has been rapidly advancing. They enable wavefront manipulation by spatially distributing individual phase-shifter elements optimized for a single wavelength.

The development of optical elements that can simultaneously manipulate multiple wavelengths has been an active area of research for refractive, diffractive and metasurface-based optics. Metasurfaces have achieved flat optics with performance comparable to conventional diffractive optics but are still limited to single-wavelength applications due to chromatic aberrations, as illustrated in FIG. 1A. As shown, in conventional refractive optics (110), chromatic aberrations can be corrected by using multiple refractive optical elements (115) at the cost of creating larger and heavier optical systems. Multi-wavelength diffractive optics (125) rely on structures multiple times thicker than the monochromatic ones (120), in order to accommodate multiple phase profiles, such that the required phase wrapping at a particular wavelength is expanded to multiples of 2π, in order to spatially match that of a different wavelength. Metasurfaces based on waveguides (130) utilize high-aspect-ratio pillars as the phase-shifter elements. For metasurfaces based on waveguide elements (130), multi-wavelength phase profiles are fitted using either guided mode resonances with larger height or coupling waveguides with small separation (135), such that more than a phase change is needed as in conventional refractive optics, which requires much higher pillars or otherwise limits the operation to reflection mode. Problematically, all of these approaches involve significant increase in structure thickness and/or system complexity, which is both a fundamental and a practical limitation for multi-wavelength optics, making their integration with electronics and micromechanical devices almost impossible.

Referring now to FIG. 1B, a metasurface 160 based on thin resonators is shown. For metasurfaces (160) based on ultrathin resonators (165), multi-wavelength functionality can be achieved by modulation of the transmitted light using a digital coding scheme (170), as described further herein, without increasing the metasurface thickness or geometry complexity. The inventors use dielectric nanodiscs (cylinders) as resonators 165, with thickness ranging from 50 nm to 200 nm, which is much smaller than the wavelength of the light (400 nm to 700 nm), as the building blocks. These dielectric resonators (165) support multiple electric and magnetic dipolar Mie resonances whose spectral position can be tailored to manipulate the transmission of predetermined spectral bands in the electromagnetic spectrum. By spatially modulating the amplitude of the transmitted light, instead of engineering the phase profile, the lens design may be simplified with a digital transmission coding scheme that allows manipulation of multiple wavelengths without increasing the complexity or thickness of the structural elements (shown at 170). The low aspect ratio (<1:1) of the metasurfaces provides improved compatibility with CMOS/MEMS (microelectromechanical systems) fabrication, and improved scalability with high-throughput optical device production techniques, such as nanoimprint and deep ultraviolet (UV) stepper lithography. The single-layer metasurfaces (160) are capable of bringing multiple visible wavelengths into focus at the same point, i.e., achromatic metalenses for visible light (170).

Figure 2:
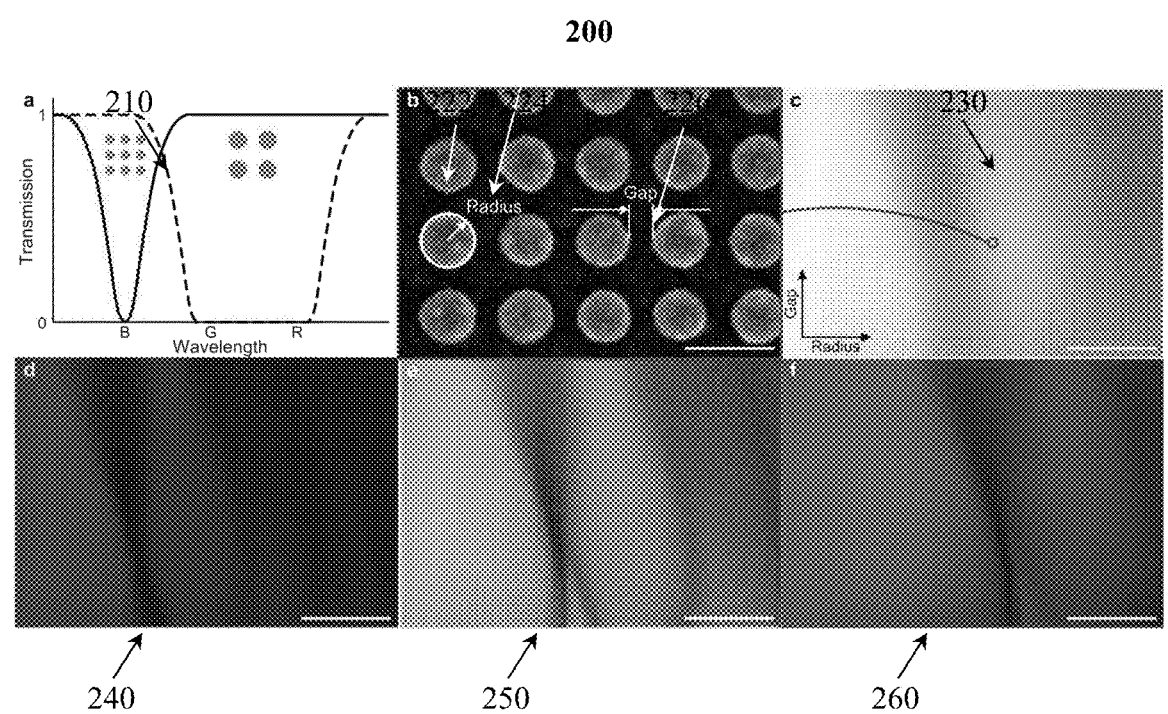
FIG. 2 shows aspects of a metasurface comprising ultrathin titanium dioxide nanoresonators used in an ultrathin, polarization-independent metalens for manipulating multiple wavelengths of visible light.

FIG. 2 shows aspects of a metasurface 200 comprising ultrathin titanium dioxide resonators (nanoresonators) used in an ultrathin, polarization-independent metalens for manipulating multiple wavelengths of visible light. High-refractive index dielectric resonators are compelling nanostructures to manipulate visible light because, in addition of having negligible losses, they exhibit electric and magnetic optical resonances that can be engineered to implement arbitrary transmission patterns. A high-index dielectric cylindrical particle, when illuminated along its axis of symmetry (z-axis), will exhibit an electric dipolar (ED) and magnetic dipolar (MD) resonance. The magnetic resonance originates from exciting an electromagnetic mode inside the particle with a circular displacement current of the electrical field. By modeling the structural elements as dielectric disks having an electrical dipole in the x-direction and magnetic dipole in the y-direction, it is possible to calculate the intensity of the transmitted light after illumination by a plane wave propagating along the z-axis.

In a metasurface, these Mie-type resonances can be further tuned by changing the in-plane geometry of the resonator array, which allows the control of both the central wavelength and the bandwidth of the transmitted light. In this way, the resonance spectra can be tailored to block or transmit the light of specific bands of visible wavelengths, which is important for the design of multi-wavelength metalenses by amplitude modulation. For example, item 210 shows the ideal optical responses of two different arrays of dielectric cylindrical nanoresonators. Here, the solid line represents the transmission spectrum of a densely packed square array characterized by a narrow resonance blocking one wavelength (blue). The dashed line represents the transmitted light of a similar array with larger resonators and spaces, resulting in a wide resonance blocking a band of wavelengths (from green to red). By varying the in-plane geometry of the dielectric nanoresonators, it is possible to design arbitrary transmission spectra involving any desired wavelength combinations (from blocking single wavelengths to bands of wavelengths).

Item 220 shows a scanning electron microscope (SEM) image of a square array of ultrathin titanium dioxide nanoresonators 222 fabricated on a quartz substrate using atomic layer deposition and e-beam lithography techniques. Conventionally, titanium dioxide has been widely used for metasurfaces in the visible spectrum, but only as high-aspect-ratio waveguide phase-shifter elements. Inventors determined that one way to show the effect of the in-plane dimensions on the transmitted light is by building a super-array of nanostructures (an array of arrays of resonators) where the radius 224 of the nanoresonators in each sub-array is increased along the horizontal direction, and the gap 226 between the nanoresonators of each sub-array is increased along the vertical direction. In the example embodiment, the resonators 222 have the following geometric parameters: thickness=90 nm, radius=160 nm, gap=110 nm.

Item 230 shows an example super-array of resonators. Each square pixel in item 230 is one of sub-arrays of nanodiscs with constant radius (shown along the x-axis) and gap (shown along the y-axis), similar to the one shown in item 220. Under white light illumination using a Halogen lamp, the transmission image of the super-array has a diversity of colors covering the entire visible spectrum.

The response of the same super-array of item 230 when illuminated with monochromatic light at different RGB wavelengths can be seen in item 240, 250 and 260. The wavelengths used were 473 nm, 532 nm, 633 nm, respectively. For each color, the intensity of the transmitted light changes with the in-plane geometry of the arrays. The dark bands of reduced transmission indicate the presence of dipolar resonances: the main dipolar resonance occurs at smaller radii (50-200 nm depending on the light wavelength) of resonators while higher-order dipolar moments occur at larger radii (>150 nm). These results enable direct identification of the in-plane geometrical parameters required to block or transmit colors with arbitrary intensity. Moreover, the higher-order polar moments (quadrapole or larger) can be useful for further optimization of the transmission patterns when bands of wavelengths need to be coordinated.

Figure 3A:
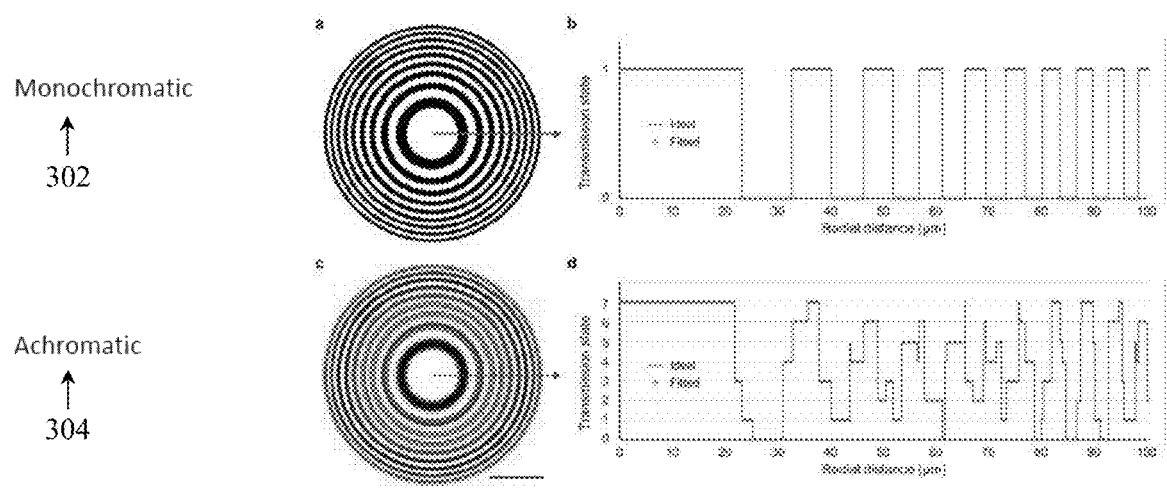
FIG. 3A-3C illustrate aspects of metalenses.
Figure 3B:
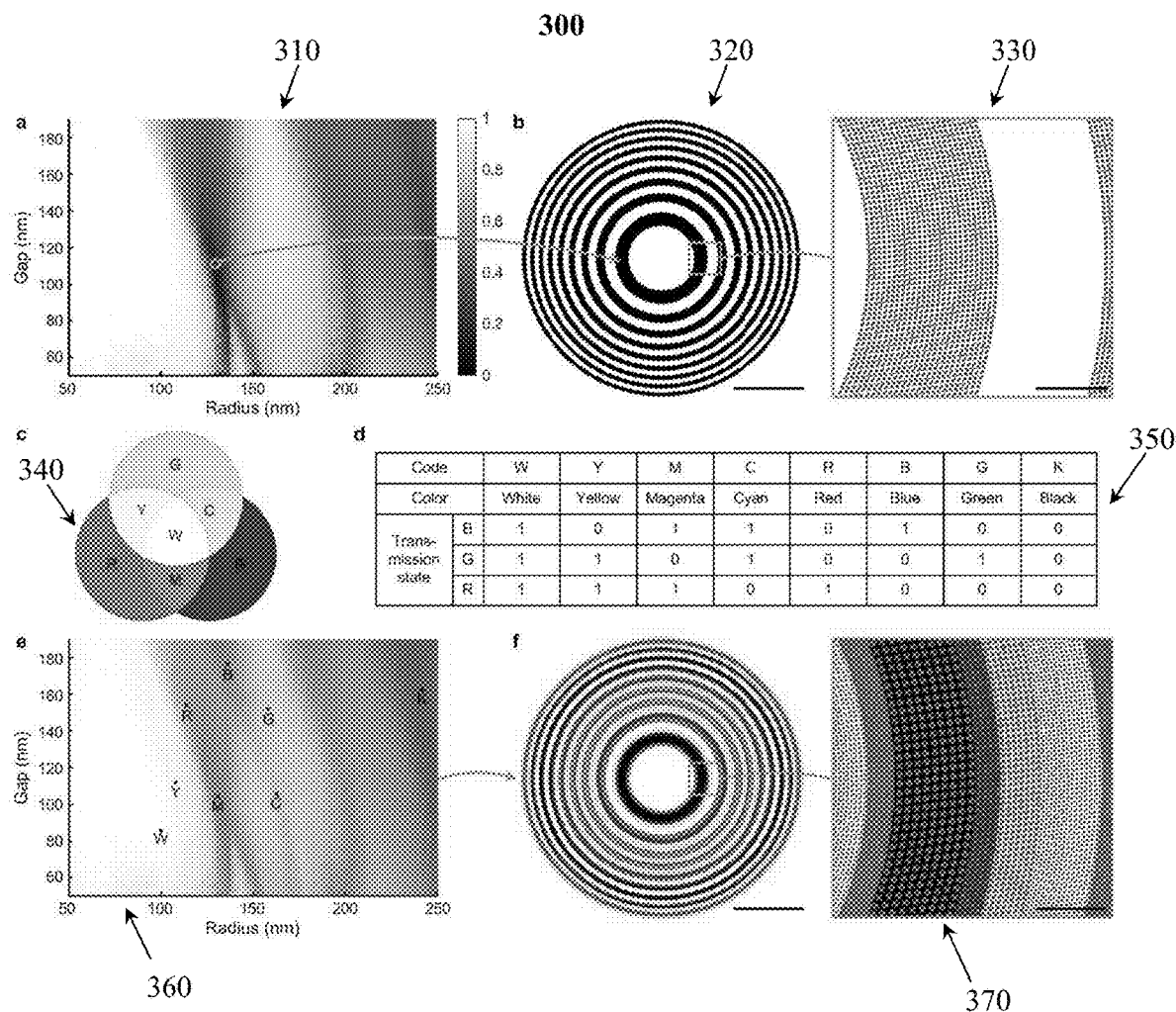
Figure 3C:

FIG. 3A-3C illustrate aspects of metalenses described herein. The metalenses comprise metasurfaces that include nanoresonators, such as ultrathin dielectric resonators.

FIG. 3A shows aspects of a metalens for achromatic transmission. As shown at 302, in conventional systems, monochromatic transmission is achieved using a lens having a binary transmission state.

In contrast, as shown at 304, achromatic transmission is achieved using a metalens having a multi-order transmission state, which can be achieved using a modified Fresnel structure. Thus, the metalens of 304 can be a modified Fresnel zone plate (FZP), such as that of FIG. 4, having arrays of geometrically tuned resonators. An FZP consists of concentric transparent and opaque rings that create a macroscopic diffractive element which focuses light. The zones, or position of the concentric rings, are defined by:

$$r_n = \sqrt{n\lambda\left(f + \frac{n\lambda}{4}\right)}, \quad (1)$$

where $r_n$ is the nth zone radius, $\lambda$ is the wavelength, and f is the focal distance. The binary zones alternate between transparent and opaque starting from the center. The choice of the 1st zone is arbitrary and equivalent. In this way, the out-of-phase light is blocked by the opaque zones and in-phase light is transmitted with interference at the designed focal spot. Thus, in order to build a FZP, only local binary modulation of the transmitted light is required (1-bit control), which can be easily achieved with ultrathin dielectric resonators, as shown at 240-260 of FIG. 2. For instance, by processing the transmission data of a super-array illuminated with green light (see item 250 of FIG. 2), the in-plane geometrical parameters required to build a monochromatic green metalens ($\lambda$=532 nm) can be identified.

FIG. 3B shows aspects of a metalens for achromatic transmission using a digital transmission modulation scheme.

The in-plane geometrical parameters required to build a monochromatic green metalens ($\lambda$=532 nm) can be identified in items 310-330. Item 310 shows a graph of super-array transmission plotted on the radius-gap plane for $\lambda$=532 nm. The data are from item 115 of FIG. 1A, normalized by intensity through a bare quartz substrate. As shown at 320 and 330, nanoresonators with the lowest transmission selected from the super-array of resonators shown at 310 were filled in the opaque zones of a monochromatic metalens, implemented as a binary FZP defined by Equation 1.

Item 340 shows the RGB color model, and item 350 shows the corresponding transmission states. An achromatic metalens needs to simultaneously modulate the amplitudes of three different wavelengths. As a consequence, for a given position in the metasurface, the amplitude of each of the three colors (RGB) needs to be binarily modulated, requiring $2^3$ transmission states (3-bit control) corresponding to eight colors of the RGB model with 0 representing blocked light and 1 representing transmitted light. The ultrathin titanium dioxide nanoresonator arrays provide a unique platform to engineer the required eight transmission states in a single layer.

At 360, the experimental transmission pattern of a super-array when illuminated with three discrete wavelengths of RGB is shown. Composite RGB transmission is plotted on the radius-gap plane as a result of superimposing the data from 115, 125, and 155 of FIGS. 1A and 1B to show the various colors of the transmission states. The geometric parameter search results that identified the highest light transmission amplitude for each of the desired colors in 350 are labeled by the color code from 350 and listed in FIG. 3C. Three major features can be seen at 360. First, at small gaps (less than 120 nm), individual RGB wavelengths can be blocked, resulting in the transmission of the complementary colors of cyan, magenta and yellow (dots marked as C, M and Y). Second, for larger gaps (greater than 140 nm), pairs of blocking bands overlap with low enough transmitted light for 2 colors to create the primary RGB colors (dots marked as R, G and B). Third, for small gaps and radii (100 nm gap and 100 nm radius), the nanoresonators are fully transparent to all RGB wavelengths and white light gets transmitted (dot marked as W). By changing the in-plane geometry of resonators within the arrays, the titanium dioxide nanoresonator arrays of the example embodiment enable the transmission of arbitrary color combinations, which is important in achromatic lens design.

At 370, the layout of an achromatic metalens is shown, where the layout is simulated by superimposing three RGB monochromatic FZP layouts onto the same surface. The layout process is similar to the monochromatic one, starting from geometric parameter search based on the super-array transmission data shown at 360. When the focal distance is kept constant for three different wavelengths, the zone radii increase with wavelength (Equation 1), resulting in different FZP layouts for each color, whose binary zones spatially overlap, forming new color zones corresponding to the 3-bit transmission states of the achromatic metalens (350). Within each overlapped zone, the required transmission states can be created by selecting the optimized radius and gap values from the super-array transmission pattern 360. Nanoresonators with optimized geometry (radii and gap) were used to fill in the corresponding color zones.

In the embodiments of FIG. 3B, the size bar for 320 and 370 is 50 μm. All the lenses shown have lens diameter D=200 μm, focal distance f=1 mm, and numerical aperture NA=0.1. Lens diameters can range from 1 μm to an unbounded larger diameter. The focal distance can range from approximately the wavelength of light (~500 nm limited by near field effects) to an unbounded larger distance. The numerical aperture is defined by these other two parameters.

FIG. 3C shows supporting data for various parameters of the embodiment of FIG. 3B. The geometric parameter search results are labeled by the color code from 350 and listed in FIG. 3C. As shown, table 380 includes columns for code 382, its corresponding color 384, the corresponding transmission states 386, and the corresponding geometric parameters 388 of an example array of resonators in an achromatic metalens. A commercial software (Lumerical) using the finite-difference time-domain (FDTD) analytical methods was used to study the dielectric resonance. A uniform titanium dioxide nanoresonator array was simulated by a single nanodisc with incident plane wave and periodic boundary conditions. The light transmission was quantified as the power transmitted through the nanoarray, normalized by the source power. The geometric parameters of both radius and gap were swept in the simulation, in order to compare with the experimental results of super-arrays.

According to various embodiments, any binary diffractive optics of multiple wavelengths can be combined into a single layer, following the digital transmission modulation scheme such as that shown in FIG. 3B and FIG. 3C. Thus, while the example embodiments described herein include a spherical lens focusing multiple wavelengths to the same spot, other implementations are contemplated. For example, each layer could have different beam shaping functions, as long as each of them can be achieved by binary diffractive optics at a single wavelength.

Figure 4:
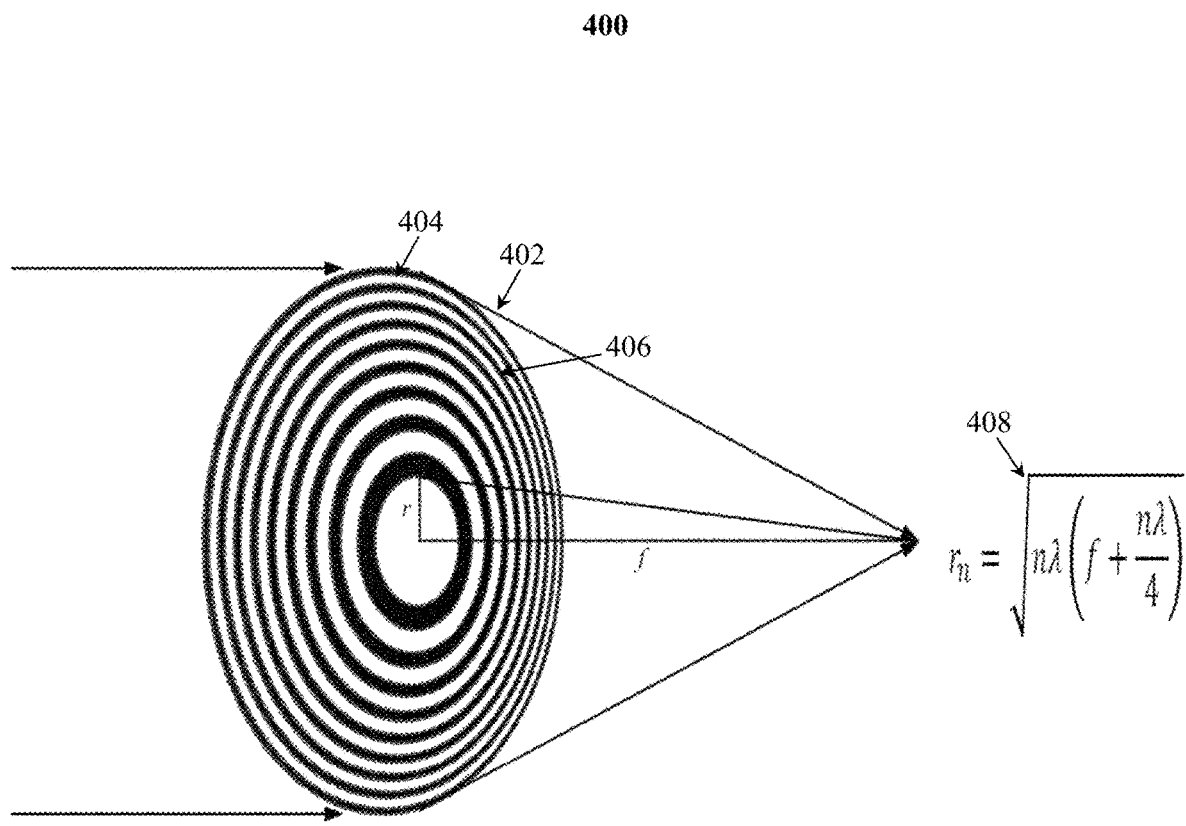
FIG. 4 shows a Fresnel zone plate, which embodies a lens that can be used for amplitude modulation instead of phase modulation, thus allowing for more than two transmission states.

FIG. 4 shows a Fresnel zone plate 402 of an example embodiment 400. The Fresnel zone plate 402 includes one or more transparent zone(s) 404 and one or more opaque zone(s) 406. Each of the one or more transparent zone(s) 404 and one or more opaque zone(s) 406 are concentric circles, whose progressively increasing radii are defined by the equation 408 (see also equation (1) herein).

In its original state, a Fresnel zone plate supports binary (on or off) transmission in a monochromatic metalens, where out-of-phase light is blocked by the opaque zones 404 and in-phase light is transmitted. As described in reference to FIG. 3B, in its modified form, the Fresnel zone plate can be used for amplitude modulation instead of phase modulation, thus allowing for more than two transmission states. This is accomplished by configuring resonator geometry in various zones (concentric circles) of the Fresnel zone plate 400 to increase the number of transmission states.

Figure 5:
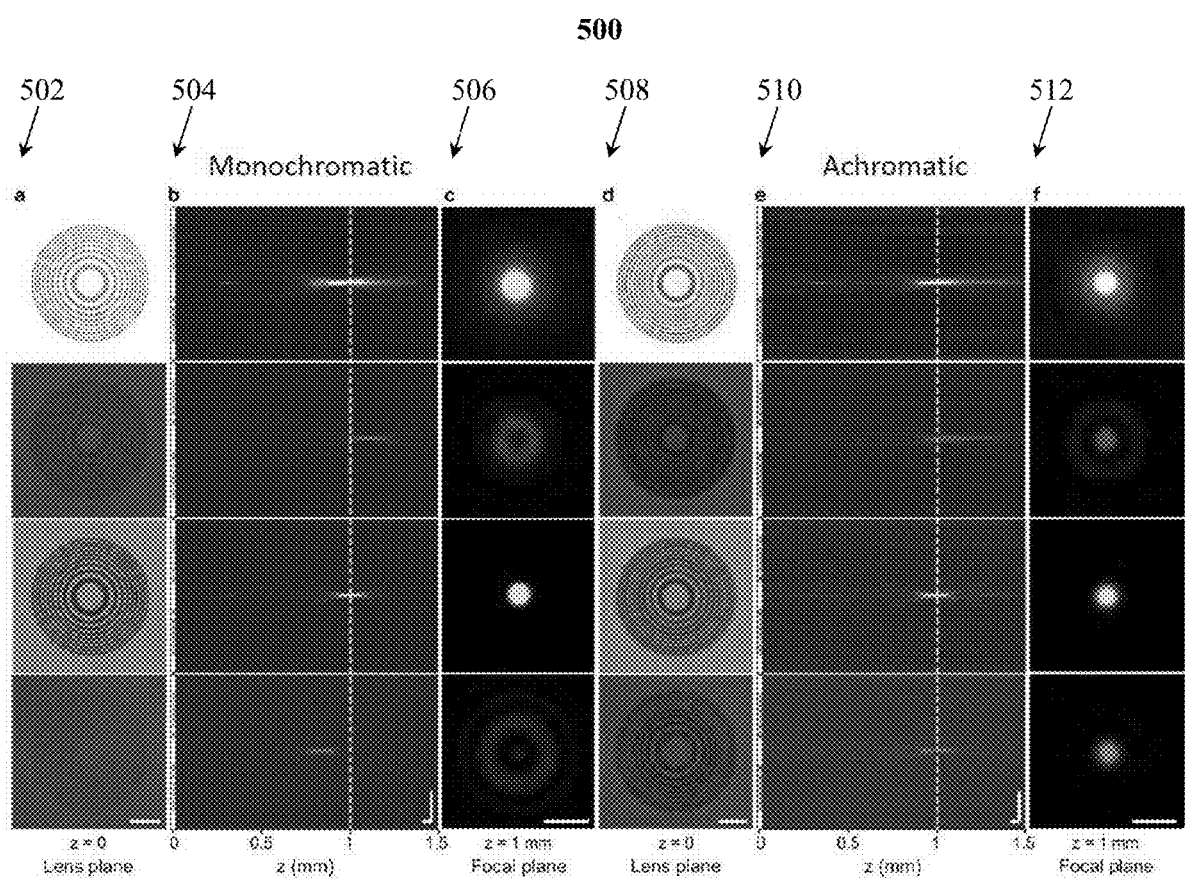
FIG. 5 shows metalens focusing characteristics of a metalens of FIG. 3B.
Figure 6:
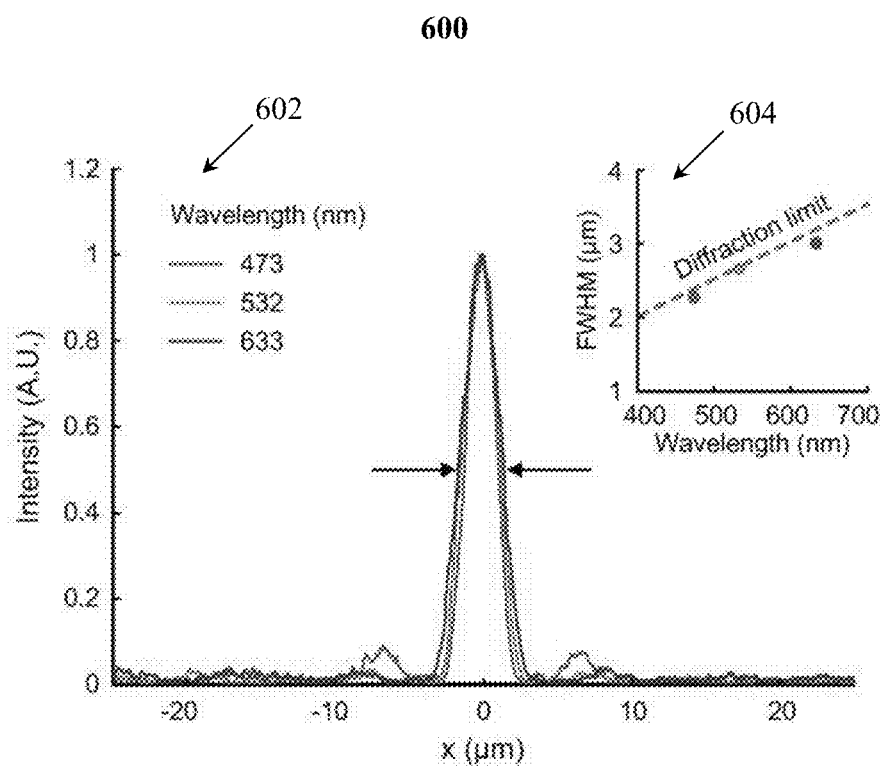
FIG. 6 illustrates achromatic metalens focusing with laser for a metalens of FIG. 3B.

Referring now to FIG. 5 and FIG. 6, to determine the optical characterization profiles for the metalens of the present disclosure, an inverted microscope (in the example discussed herein, Olympus IX73) was used to image the super-array and metalens samples in transmission. The samples were characterized by both incoherent unpolarized white light (Halogen lamp), and lasers at the RGB wavelengths: 473 nm, 532 nm, and 633 nm (in the example discussed herein, Opto Engine). The white light was also filtered by band-pass filters with 10 nm bandwidth (in the example discussed herein, Edmund Optics) at the corresponding wavelengths. When the white light and filtered light were used for the characterization of metalens focusing (intensity distribution in the x-z plane and focal x-y plane, as shown in FIG. 5), a 100 μm aperture was added before the microscope condenser, in order to approximate a point source. Image stacks were taken while moving the stage in z-direction automatically (in the example discussed herein, Prior ES10ZE Focus Controller) and processed to obtain the x-z intensity distribution. Lasers were introduced from top of the microscope, replacing the lamp source, in order to characterize the diffraction-limited focusing (focal spot intensity profiles, as shown in FIG. 6).

FIG. 5 shows metalens focusing characteristics 500 of a metalens 370 of FIG. 3B. A variety of monochromatic and achromatic metasurface-based metalenses were fabricated using a process flow described in FIG. 7. The fabricated metalenses were characterized with incoherent unpolarized white light, filtered white light and monochromatic lasers at the corresponding RGB wavelengths.

Items 502-506 describe aspects of optical characterization of a monochromatic ultrathin dielectric metalens. Items 508-512 describe aspects of optical characterization of an achromatic ultrathin dielectric metalens. Items 502 and 508 are optical microscope images of the metasurfaces. Items 504 and 510 show intensity distribution on the axial direction (x-z plane, where x denotes the radial distance from the center of the lens, and z denotes the axial distance from the surface of the lens along the focal direction). Items 506 and 512 show images of the designed focal plane (x-y plane, z=1 mm). The top row corresponds to white light (Halogen lamp) illumination, while the rows below the top row were obtained using filtered light at the wavelengths 473 nm, 532 nm, and 633 nm, respectively, through a 100 μm aperture. The size bar for 502, 504, 508 and 510 indicates 50 and the size bar for 506 and 512 corresponds to 10 μm.

Optical images of a monochromatic metalens designed for green light (λ=532 nm, f=1 mm and NA=0.1) are shown at 502, under different illumination conditions: white light, blue, green and red filtered light (from top to bottom). Since the opaque zones are targeted to block only green light, but not blue or red, the lens of the example embodiment at 502 displays a color of magenta when illuminated with white light. Moreover, the lens of the example embodiment at 502 shows chromatic dispersion (at 504 under the same illumination conditions as 502) similar to a conventional FZP. Only green light is focused at the designed focal distance of 1 mm (at 504) and different wavelengths get focused on to different focal points, such that the shorter the wavelength, the longer the focal distance. At the focal plane of 1 mm (at 506), only green light shows a well-defined circular spot.

Optical images of the achromatic metalens (f=1 mm and NA=0.1) are shown at 508 using the same illumination conditions as in 502. Under white light illumination, the lens appears as a composite of concentric zones of different colors (as in FIG. 3B at 370) while under monochromatic illumination only the corresponding Fresnel structure is observed. At 510, the measured intensity distribution along the axial direction is presented, where the metasurface is acting as an achromatic lens focusing white light and three predetermined wavelengths at the same focal distance of 1 mm. The intensity distribution in the focal plane (at 512) is characterized by sharp and symmetrically circular spots with similar size. As described relative to FIG. 6, the focal spots were also characterized using lasers at the respective RGB wavelengths, resulting in focal spots at the same axial position (z=1 mm) with slightly different sizes corresponding to a diffraction limited focal point for each of the different wavelengths.

The numerical aperture (NA) of an optical system is a dimensionless number that characterizes the range of angles over which the system can accept or emit light. High numerical apertures are required for many applications, but the maximum numerical aperture experimentally achieved in conventional multi-wavelength metasurfaces is only 0.2. To demonstrate the versatility of the presented approach, achromatic lenses with higher numerical apertures were fabricated and characterized. In the example embodiment, an ultrathin metalens has NA=0.37, lens diameter of 200 µm, and a shorter focal distance of 250 µm.

FIG. 6 illustrates achromatic metalens focusing with laser for a metalens 370 of FIG. 3B.

On graph 602, the x-axis shows the radial distance from the center of the metalens and the y-axis shows the transmitted intensity (optical power per unit area corresponding to the amplitude of the wavelength at x). Focal spot intensity profiles for different wavelengths: 473 nm, 532 nm, and 633 nm, corresponding to the intensity distribution for a metalens shown in item 360 of FIG. 3B (filtered white light).

On graph 604, the x-axis identifies the wavelength, and the y-axis identifies the full-width at half-maximum (FWHM) of the wavelength identified along the x-axis. The FWHM is the width of a spectrum curve measured between those points on the y-axis which are half the maximum amplitude. The intensity data were fitted to a Gaussian profile in order to determine the FWHM for each wavelength. The obtained values correspond to diffraction limited focal spots.

Figure 7:
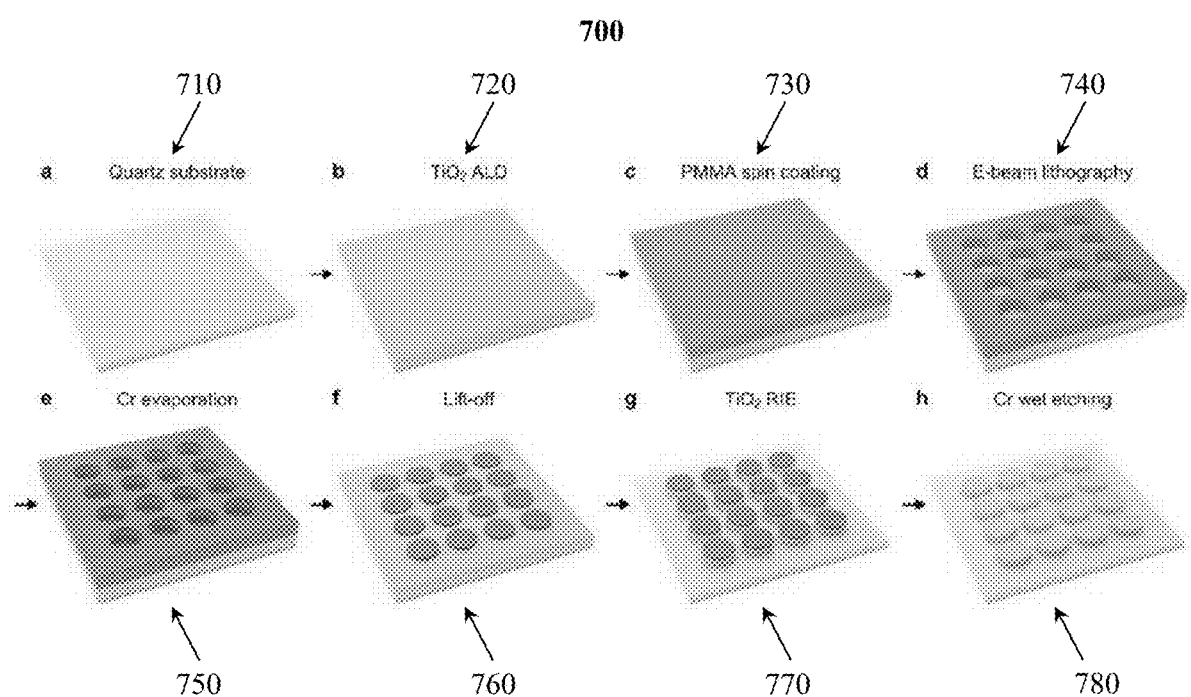
FIG. 7 illustrates aspects of metasurface fabrication for a metalens of FIG. 3B.

FIG. 7 illustrates aspects 700 of metasurface fabrication for a metalens 370 of FIG. 3B. The metasurfaces were composed of titanium dioxide nanoresonator, whose thickness was precisely controlled by atomic layer deposition, and the in-plane geometry (radius, gap) was patterned by e-beam lithography, which is shown schematically. Quartz substrates 710 with 90 nm titanium dioxide film 720 were spin-coated, at 730, with resist bilayer of polymethyl methacrylate (PMMA) and copolymer, and then exposed, at 740, by a single step of e-beam lithography. At 750, a 30 nm chromium layer was deposited by e-beam evaporation and then lifted off (at 760), forming hard masks for pattern transfer. After dry etching of titanium dioxide (at 770) and wet etching of chromium masks (at 780), metasurfaces of titanium dioxide nanoresonator arrays were formed on the quartz substrates.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (i.e. "top," "bottom," "above," "below," "on," etc.) are merely used to describe the orientation of various elements in the figures. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed:

1. An optical device comprising:
a substrate configured to focus light in visible wavelength spectrum of 400 nm to 700 nm and comprising a first zone and a second zone, wherein the first zone and the second zone are concentric circles and wherein the second zone has a second zone radius larger than a first zone radius of the first zone; and
at least one layer comprising a plurality of resonators on the substrate, the plurality of resonators comprising a first plurality corresponding to the first zone and a second plurality corresponding to the second zone, each of the plurality of resonators having a gap "g" in the range of 5 nm to 200 nm between adjacent resonators of the plurality of the resonators, each resonator comprised of a dielectric material with a defined thickness "t" in the range of 30 nm to 300 nm, and each resonator having a radius "r" in the range of 30 nm to 300 nm;
wherein the plurality of resonators form a metasurface.

2. The optical device of claim 1, wherein each of the first zone and the second zone is defined by $$r_n = \sqrt{n\lambda\left(f + \frac{n\lambda}{4}\right)},$$

wherein $r_n$ denotes nth zone radius, $\lambda$ denotes wavelength, and f denotes focal distance.

3. The optical device of claim 1, wherein each of the plurality of the resonators comprises titanium dioxide.

4. The optical device of claim 1, wherein each of the plurality of the resonators comprises gallium phosphide.

5. The optical device of claim 1, wherein the metasurface has an aspect ratio of smaller than 1:1.

6. The optical device of claim 1, wherein the metasurface comprises a plurality of layers.

7. The optical device of claim 6, wherein each layer has a unique beam shaping function.

8. The optical device of claim 1, wherein the first plurality of resonators in the first zone have a first radius within a first radius range that is different from a second radius range of the second plurality of resonators in the second zone.

9. The optical device of claim 8, wherein the first plurality of resonators in the first zone have a first gap within a first gap range that is different from a gap radius range of the second plurality of resonators in the second zone.

10. The optical device of claim 8, wherein each of the plurality of resonators is substantially a right circular cylinder or substantially a right elliptical cylinder, and wherein at least some of the plurality of the resonators have a constant radius and a constant gap.

11. The optical device of claim 8, wherein the metasurface comprises a modified Fresnel zone plate, the modified Fresnel zone plate comprising: the first zone configured to transmit black, the first zone comprising the first plurality of resonators, each having a first radius within a range of 30 nm to 300 nm, and a first gap between resonators within a range of 5 nm to 200 nm; and the second zone configured to transmit white, the second zone comprising the second plurality of resonators.

12. The optical device of claim 11, wherein each of the second plurality of resonators has a second radius of 100 nm and a second gap between resonators of 86 nm.

13. The optical device of claim 8, wherein the modified Fresnel zone plate comprises at least one of:
the first zone comprising the first plurality of resonators, each having a first radius and a first gap, wherein the first zone is configured to transmit black by pre-setting the first radius and the first gap;
the second zone comprising the second plurality of resonators, each having a second radius and a second gap, wherein the second zone is configured to transmit white by pre-setting the second radius and the second gap;
a third zone comprising a third plurality of resonators, each having a third radius and a third gap, wherein the third zone is configured to transmit red by pre-setting the third radius and the third gap;
a fourth zone comprising a fourth plurality of resonators, each having a fourth radius and a fourth gap, wherein the fourth zone is configured to transmit green by pre-setting the fourth radius and the fourth gap;
a fifth zone comprising a fifth plurality of resonators, each having a fifth radius and a fifth gap, wherein the fifth zone is configured to transmit yellow by pre-setting the fifth radius and the fifth gap;
a sixth zone comprising a sixth plurality of resonators, each having a sixth radius and a sixth gap, wherein the sixth zone is configured to transmit blue by pre-setting the sixth radius and the sixth gap;
a seventh zone comprising a seventh plurality of resonators, each having a seventh radius and a seventh gap, wherein the seventh zone is configured to transmit magenta by pre-setting the seventh radius and the seventh gap; and
an eighth zone comprising an eighth plurality of resonators, each having an eighth radius and an eighth gap, wherein the eighth zone is configured to transmit cyan by pre-setting the eights radius and the eighth gap.

14. The optical device of claim 13, wherein:
the first radius is 240 nm and the first gap between resonators is 162 nm;
the second radius is 100 nm and the second gap between resonators is 86 nm;
the third radius is 114 nm and the third gap between resonators is 154 nm;
the fourth radius is 158 nm and the fourth gap between resonators is 152 nm;
the fifth radius is 108 nm and the fifth gap between resonators is 112 nm;
the sixth radius is 136 nm and the sixth gap between resonators is 176 nm;
the seventh radius is 130 nm and the seventh gap between resonators is 104 nm; and
the eighth radius is 162 nm and the first gap between resonators is 106 nm.

15. The optical device of claim 8, wherein the metasurface is configured to modulate amplitude of multiple different wavelengths of a visible light spectrum by setting the gap "g" between at least some of the plurality of resonators to a predetermined value and by setting the radius "r" of at least some of the plurality of resonators to a predetermined value.

16. The optical device of claim 15, wherein the metasurface is configured to support more than two transmission states.

17. The optical device of claim 15, wherein the metasurface is configured to support at least 2" transmission states, wherein n is a number of multiple wavelengths.

18. The optical device of claim 15, wherein the different wavelengths are red, green, and blue.

19. The optical device of claim 18, wherein at least some of the different wavelengths are blocked such at least one of cyan, magenta and yellow color streams is transmitted.

* * * * *